United States Patent [19]

Possati et al.

[11] 4,382,338

[45] May 10, 1983

[54] MANUAL PLUG COMPARATOR FOR CHECKING THE DIAMETER OF HOLES

[75] Inventors: Mario Possati; Guido Golinelli, both of Bologna; Narciso Selleri, Monteveglio, all of Italy

[73] Assignee: Finike Italiana Marposs S.p.A., S. Marino di Bentivoglio, Italy

[21] Appl. No.: 268,638

[22] Filed: May 29, 1981

[30] Foreign Application Priority Data

Jun. 2, 1980 [IT] Italy .................. 3435 A/80

[51] Int. Cl.³ .................. G01B 7/12; G01B 3/26
[52] U.S. Cl. .................. 33/178 E; 33/143 L; 33/147 K
[58] Field of Search .......... 33/143 L, 147 K, 147 N, 33/178 B, 178 E

[56] References Cited

U.S. PATENT DOCUMENTS

| | | | |
|---|---|---|---|
| 2,076,944 | 4/1937 | Howe | 33/178 E |
| 2,369,909 | 2/1945 | Mestas | 33/178 E |
| 2,474,802 | 6/1949 | Poole | 33/178 E |
| 2,642,671 | 6/1953 | Graham et al. | 33/178 E |
| 4,030,202 | 6/1977 | Fadl et al. | 33/178 E |
| 4,077,130 | 3/1978 | Possati | 33/178 E |
| 4,290,204 | 9/1981 | Possati | 33/147 K |

FOREIGN PATENT DOCUMENTS 55-25862  2/1979  Japan .................. 33/147 K

Primary Examiner—Richard R. Stearns
Attorney, Agent, or Firm—Stevens, Davis, Miller & Mosher

[57] ABSTRACT

A manual plug comparator for verifying the diameter of holes of mechanical parts, having a central support plate which supports a movable measurement unit, a protective and centering casing and a handle. The movable measurement unit comprises two movable arms each bearing a feeler, which feelers come into contact with the part to be checked. An electric cord terminating in a connector makes it possible to connect a position transducer which notes the position of the movable arms to an electrical supply, detection and indication group. A cord-holder device is fastened to one end of the handle in a removable manner. The handle has an opening which, after the removal of the cord-holder device and the detachment of the handle from the support plate, makes it possible completely to remove the handle from the cord and the connector.

9 Claims, 10 Drawing Figures

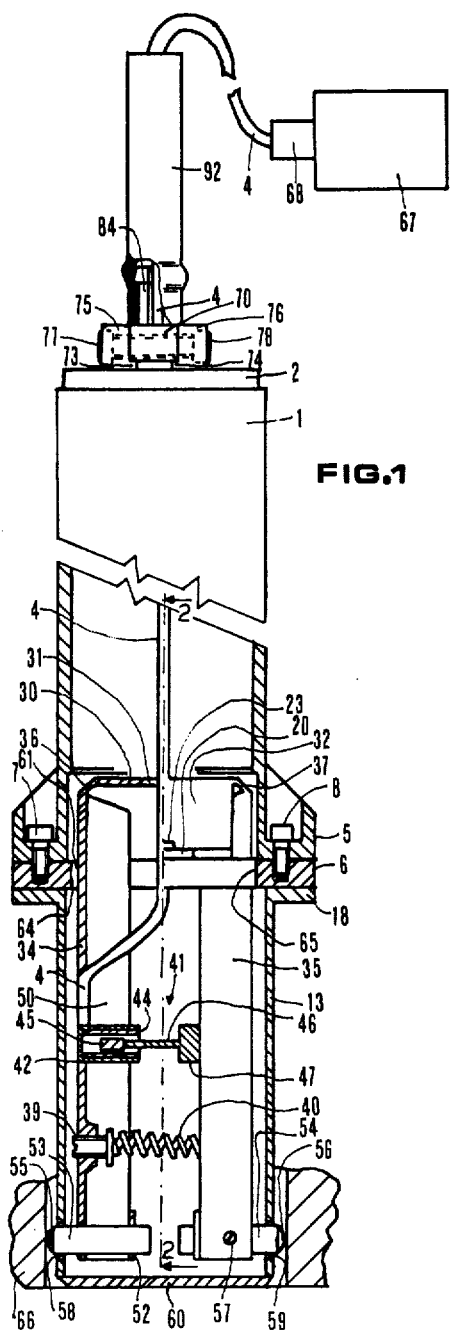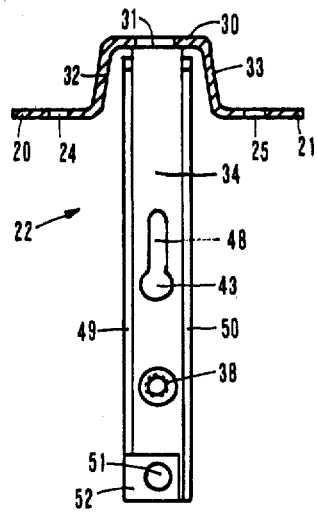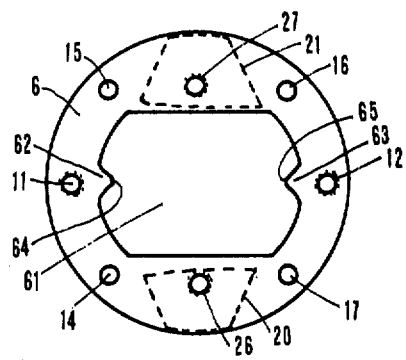
FIG.1
FIG.2
FIG.3

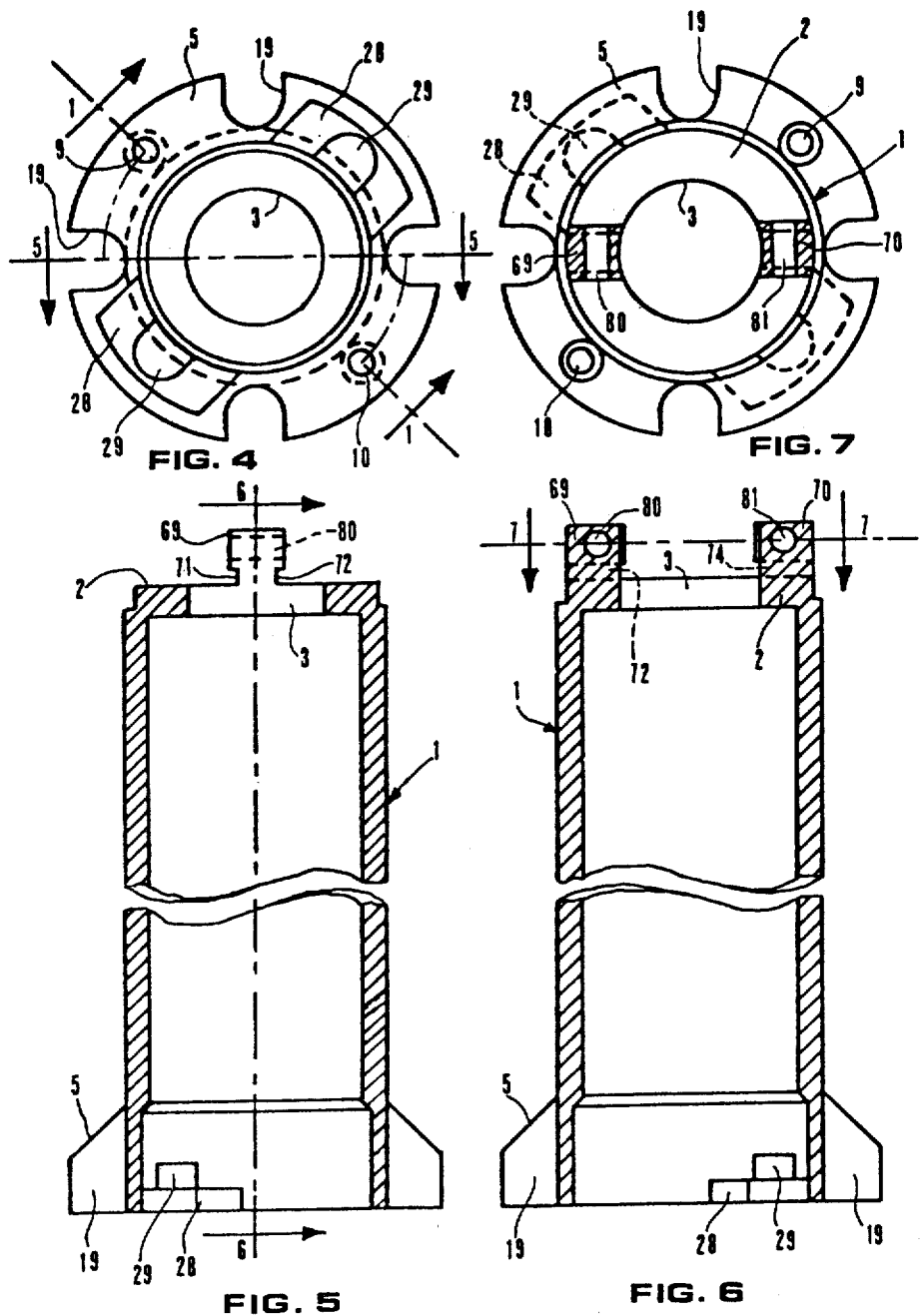

MANUAL PLUG COMPARATOR FOR CHECKING THE DIAMETER OF HOLES

The present invention relates to a manual plug comparator for checking the diameter of holes of mechanical parts, having a support element, two movable arms supported by the support element, two feelers fastened to the movable arms respectively in order to come into contact with diametrically opposite points of the part to be checked, means adapted to permit opening and closing movements of the arms, a casing fastened to the support element, transducer means adapted to note the position of the movable arms, an electric cord connected to the transducer means, a connector connected to one end of the cord in order to connect the cord to an electrical supply, detection and indication group and a handle having an opening for the passage of the cord.

BACKGROUND OF THE INVENTION

Manual plug comparators of traditional type comprise a support structure, two movable arms with feelers, a casing, a handle, a transducer for noting the reciprocal position of the movable arms, an electrical supply, detection and indication group and electrical connections between the group and the transducer.

These known plugs have various drawbacks, due to the complex nature of the operations of assembling and disassembling the handle and the electrical connections.

SUMMARY OF THE INVENTION

The technical problem which the present invention proposes to solve is that of providing a manual plug comparator having a structure which simplifies the assembling and disassembling operations, reduces the cost thereof and makes it more reliable.

It solves this problem by a comparator of the type indicated in the preamble to the specification in which, in accordance with the invention, the handle is connected in removable manner to the support element and the opening is sufficiently large to make it possible to permit the passage of the handle after its disconnection from the support element over the cord and the connector.

BRIEF DESCRIPTION OF THE DRAWINGS

The invention will be described in detail with reference to the accompanying drawings, which are given solely by way of illustration and not of limitation and in which:

FIG. 1 is a longitudinal view, partially in section, through a manual plug comparator in accordance with the preferred embodiment of the invention; the partial section being taken along the line 1—1 of FIG. 4;

FIG. 2 is a longitudinal cross section through the movable unit of the comparator of FIG. 1 along the line 2—2 of FIG. 1;

FIG. 3 is a plan view of a support element of the comparator of FIG. 1;

FIG. 4 is a bottom view of the handle of the comparator of FIG. 1;

FIG. 5 is a longitudinal sectional view through the handle along the line 5—5 of FIG. 4;

FIG. 6 is a longitudinal sectional view through the handle along the line 6—6 of FIG. 5;

FIG. 7 is a horizontal sectional view through the handle along the line 7—7 of FIG. 6;

DESCRIPTION OF THE PREFERRED EMBODIMENT

Figure 8:
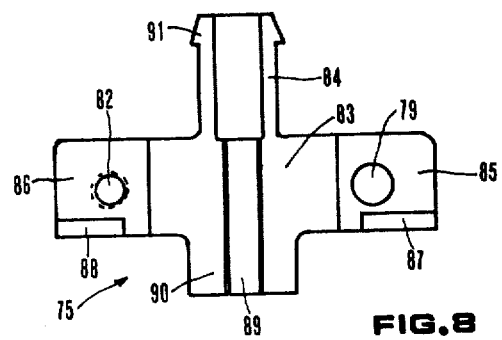
FIG. 8 is a vertical view on a larger scale of an element of a cord-holder device of the comparator of FIG. 1.

Referring to FIGS. 1 to 6, the manual plug comparator comprises a handle 1, preferably of plastic material, having an upper base 2 which is perpendicular to the longitudinal axis of the comparator with a central aperture or hole 3 (FIG. 5) for the passage of an electrical cord 4. The handle 1, which is hollow on the inside, has substantially cylindrical inner and outer surfaces coaxial with the longitudinal axis of the comparator. The lower part of the handle 1 terminates in a flange 5 which serves to connect the handle to a support element, consisting essentially of a perforated plate 6. The connection between the flange 5 and the plate 6 is effected by means of two screws 7, 8 which pass through holes 9, 10 in the flange 5 (FIG. 4) and are threaded into threaded holes 11, 12 in the plate 6 (FIG. 3) so as to clamp the lower face of the flange 5 against the upper face of the plate 6.

The plate 6 furthermore supports a protection and centering casing 13 by four screws, not visible in the drawing, which pass through holes 14, 15, 16, 17 of the plate 6 and are threaded in threaded holes, not visible in the drawing, provided in a flange 18 of the casing 13 in such a manner that the upper face of the flange 18 is clamped to the lower face of the plate 6. The four fastening holes of the flange 18 are accessible through openings 19 in the flange 5 (FIG. 4).

The plate 6 furthermore acts as a support element for the movable unit of the comparator. To the upper face of the plate 6 there are connected the lower faces of two flanges 20, 21 (FIG. 2) which form part of a single body 22 with the movable unit. The connection is effected by means of two screws, one of which, 23, is visible in FIG. 1, passing through holes 24, 25 in the flanges 20, 21 and threaded into threaded holes 26, 27 of the plate 6. In the flange 5 there are provided seats 28, 29 for housing the flanges 20, 21 and the screws 23 (FIG. 4).

The flanges 20, 21, shown partially in dashed line in FIG. 3, are opposite each other with respect to the vertical plane passing through the axis of the comparator and through the axes of the holes 11 and 12.

The body 22, obtained by bending a plate of spring steel, furthermore defines an upper base 30 of substantially rectangular perimeter and with a hole 31 for the passage of the electrical cord 4, two connecting parts 32, 33 between the flanges 20, 21 and the base 30, and two movable arms 34, 35. The arms 34, 35 are obtained by bending two flanges from the steel plate and are connected with the upper base 30 by two portions 36, 37 which are lightened by chamfers, as can be noted from FIG. 1, which form two fulcrums for the rotation of the arms 34, 35 around respective axes perpendicular to the arms.

The structure of the arms 34, 35 is substantially similar and therefore only arm 34 will be described, with reference to FIGS. 1 and 2. The arm 34 is of a C-shaped cross section so as to present high resistance to flexure and has a threaded hole 38 in which there is threaded a screw 39 (FIG. 1) which supports one end of a spring 40, the other end of which is suitably fastened to the arm 35. The spring 40 works in compression and therefore tends to open arms 34, 35. The mutual position of the two arms 34, 35 is detected by means of a position transducer 41 with a differential transformer.

The transducer 41 comprises a cylindrical housing 42 inserted into a hole 43 of the arm 34 and fastened to the arm 34.

The housing 42 contains within it the primary and secondary windings of the differential transformer. Within the windings 44 there is movable, as a result of the mutual displacements of the arms 34, 35, a magnetic core 45 supported by a shaft 46 integral with a cylinder 47 fastened to the arm 35. The cord 4, which is connected to the windings 44, emerges laterally from the housing 42 and passes through an opening 48 in the arm 34 communicating with the hole 43.

As already stated, the arms 34, 35 are of C shaped section and therefore have bent flanges 49, 50. The arms 34, 35 at their free ends house, in suitable holes 51 passing through further bent flanges 52, cylinders 53, 54 which bear feelers 55, 56 respectively. The cylinders 53, 54 are locked by screws 57 which make is possible to adjust the radial position of the cylinders and therefore of the feelers 55, 56.

The casing 13 has holes 58, 59 for the passage of the feelers 55, 56 and is closed at the bottom by a circular base or plate 60 perpendicular to the axis of the comparator.

The plate 6 (FIG. 3) is of substantially ring shape with a central hole 61 and has two inwardly protruding parts 62, 63 having approximately the shape of triangular prisms with chamfered vertices 64, 65. The two parts 62, 63 which are diametrically opposite each other in a direction perpendicular to that in which the two flanges 20, 21 are arranged, form stop surfaces adapted to delimit the opening stroke of the arms 34, 35. As a matter of fact, as can be noted also from FIG. 1, the arms 34, 35 pass through the hole 61 since the base 30 and the free ends of the arms are on opposite sides of plate 6. At the level of plate 6, the central portion of the C-shaped section of the arms 34, 35 is adjacent to the vertices 64, 65.

Therefore if the part 66 to be checked shown in FIG. 1 is removed, the opening movement caused by the spring 40 is limited due to contact of the central portion of the C-shaped section of the arms 34, 35 with the vertices 64, 65.

On the other hand, when the casing 13 is introduced into a hole of a part 66 to be checked, the feelers 55, 56, which in condition of rest protrude with respect to the surface of the casing 13 by a predetermined amount, cause the arms 34, 35 to close, bringing them into a measurement position and it is possible to read from an instrument of a supply and detection group 67 connected to a connector 68 fastened to the end of the electrical cord 4, the difference between the diameter of the hole and the value of the diameter of a sample part by means of which, as is customary, the zeroing of the comparator is effected.

From the foregoing description it can be noted that a single element, namely the plate 6, acts both as a central support to which there are connected the handle 1, the arms 34, 35 (via the intermediate support element comprising the flanges 20, 21, the base 30 and the lightened sections 36, 37) and the casing 13 and as a limiter for the opening stroke of the arms 34, 35.

The limiting of the opening stroke is obtained, as described above, by two parts of the plate or ring 6 which protrude towards the inside and which, terminating with substantially sharp-edged surfaces, define stop surfaces of small size, so as to eliminate the influence of foreign elements which may tend to deposit on the arms 34, 35 or on the stop surfaces 64, 65 and to assure a limiting of the opening stroke to a constant value. The vertices which constitute the stop surfaces may be more or less beveled or sharp, depending on the shape of the arms 34, 35.

The handle 1, above the upper base 2, has two tangs 69, 70 of substantially prismatic shape but with two faces having the shape of parts of cylindrical surfaces of the same diameter as the base 2 of the handle 1. In the lower portion of the tang 69 there are provided two opposite undercuts 71, 72 (FIGS. 5, 6). Similar undercuts 73, 74 are provided in the tang 70 (FIGS. 1 and 6).

The comparator furthermore comprises a cord-holder device consisting of two elements 75, 76 which are clamped by screws 77, 78 against the tangs 69, 70 as is visible in FIG. 1. The screw 77 passes through a hole 79 in the element 75 (FIGS. 8, 9), a hole 80 in the tang 69 and is screwed into a threaded hole of the element 76. In similar manner, the screw 78 passes through a hole in the element 76 and a hole 81 in the tang 70 and is screwed into a threaded hole 82 of the element 75.

The element 75, which is identical to the element 76, comprises a central body 83, a semitubular part 84 and two lateral arms 85, 86. The arms 85, 86, in which holes 79, 82 are present, have two teeth 87, 88, adapted to be inserted into the undercuts 71, 73 of the tangs 69, 70, which define stop surfaces cooperating with the teeth 87, 88 so as to prevent displacement of the element 75 in the axial direction of the comparator. Within the central body 83 there is provided a semicylindrical threaded seat 89, coaxial to the semitubular part 84.

When the cord-holder device is mounted, the threaded seat 89 and the corresponding seat of the element 76 grip onto the jacket of the cord 4, which is thus locked in a threaded hole. The crests of the threads penetrate into the jacket so as to prevent displacement of the cord 4 with respect to the cord-holder device and the handle 1. The lower part 90 of the body 83 and the corresponding part of the body of element 76 remain housed within the hole 3 of the handle while the lower faces of the side arms 85, 86 of the element 75 and the corresponding ones of the element 76 rest against the base 2 of the handle 1.

The semitubular part 84 and the corresponding part of the element 76 are placed together so as to form an inner hole aligned with the threaded hole formed by the threaded seats of the elements 75, 76. This inner hole has a diameter such that its surface does not grip the jacket of the cord 4. The upper end of the semitubular part 84 terminates with an outer surface 91 having the form of a semi-frusto-conical surface, with a lower base protruding with respect to the underlying outer surface of the semitubular part 84. Over the outer surface 91 defined by the semitubular part 84 and by the semitubular part of the element 76 there is placed a flexible rubber tube 92 which is locked by the frusto-conical surface defined by the elements 75, 76. The tube 92 serves to rigidify the cord 4, avoiding possible breaks in its jacket in the immediate vicinity of the cord-holder device.

The structure of the cord-holder device is such as to prevent damage to the wires of the cord 4 and to prevent mechanical stresses exerted on the cord from the outside of the comparator from being transmitted to the part of the cord located within the handle 1 and from this part of the cord to the movable arm 34.

As a matter of fact, the two parts 75, 76 of the cord-holder device cannot move either axially, due to the teeth 87, 88, or transversely, due to being abutted against the tangs 69, 70.

The side surfaces of the arms 85, 86 have the shape of parts of a cylindrical surface of a diameter corresponding to that of the base 2 of the handle. The corresponding parts of element 76 are similar so that the transverse size of the cord-holder device and of the tangs 69, 70 at the level of the arms is equal to that of the base 2.

Figure 9:
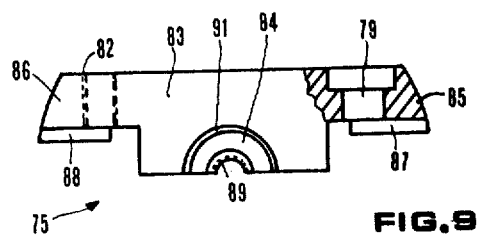
FIG. 9 is a plan view, partially in section, of the element of FIG. 8.
Figure 10:
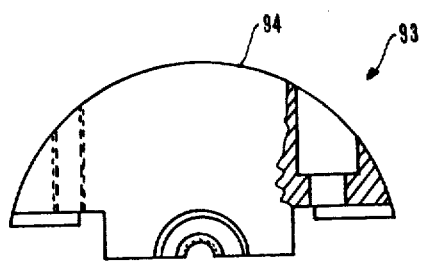
FIG. 10 is a plan view, partially in section, of an element of a cord-holder device in accordance with another embodiment of FIGS. 8 and 9.

In FIG. 10 there is shown an element 93 of a cord-holder device which differs from the one 75 shown in FIGS. 8 and 9 by the presence of a continuous side surface 94, so that the cord-holder device formed by the part 93, by another identical element and by the two tangs 69, 70 has an outer cylindrical surface of a diameter equal to that of the base 2.

The hole 3 of the handle 1 has a diameter such as to permit, after the disconnecting of the connector 68 from the group 67, the dismounting of the cord-holder device and the unscrewing of the screws 7, 8, the withdrawal of the handle 1 by passing over the cord 4 and the connector 68. In this way the assembly and disassembly of the comparator are facilitated and it is possible to assembly the comparator by easily and rapidly connecting its various assembled components together, one of which is the handle and another of which is the movable unit provided with transducer, cord and connector.

Another important characteristic of the invention resides in the fact that when mechanical stresses are applied to the handle or to the part of the cord which emerges from same through the cord-holder device, these stresses are not transmitted to the movable measurement unit since the stresses act only on the plate 6 and on the cord-holder device. This is important from the stand point of repeatability of the measurements carried out by the comparator.

It is obvious that the comparator illustrated in the drawings may have imparted thereto other changes or variations which are equivalent from a functional or structural viewpoint without thereby going beyond the scope of the invention.

What is claimed is:

1. A manual plug comparator for checking the diameter of holes of mechanical parts comprising: support means; two feelers adapted to contact diametrically opposite points of the part to be checked; feeler supporting means coupled to the feelers and the support means for permitting mutual displacements of the feelers substantially along diametral directions of said holes; transducer means coupled to the feeler supporting means for detecting the mutual positions of the feelers; a cord connected to the transducer means; a connector connected to one end of the cord to connect the cord to a supply, detection and indication unit; a handle; first connection means for fastening the handle to the support means and for permitting disconnection of the handle from the support means; a locking device defining a surface adapted to lock a portion of the cord; second connection means for fastening the locking device to the handle at an external position thereof and for permitting disconnection of the locking device from the handle and the cord; wherein said handle has an opening for the passage of the cord, this opening being sufficiently wide to permit the passage of the handle over the cord and the connector.

2. A manual plug comparator for checking the diameter of holes of mechanical parts, having a support element, two movable arms supported by the support element, two feelers fastened respectively to the movable arms in order to come into contact with diametrically opposite points of the part to be checked, means adapted to permit opening and closing movements of the arms, a casing fastened to the support element, transducer means adapted to detect the position of the movable arms, a cord connected to the transducer means, a connector connected to one end of the cord to connect the cord to a supply, detection and indication group, a handle removably fastened to the support element, the handle having an opening for the passage of the cord, a locking device removably fastened externally to one end of the handle and defining a seat adapted to grip a portion of the cord for locking this portion with respect to the handle, first connection means coupled to the handle and the support means and adapted to permit disconnection of the handle from the support means, second connection means for fastening the locking device to the handle and adapted to permit disconnection of the locking device from the handle and the cord, said opening in the handle being sufficiently wide to permit the passage of the handle over the cord and the connector.

3. The manual comparator according to claim 2, wherein said end of the handle has two tangs with stop surfaces adapted to prevent axial displacements of the locking device.

4. The manual comparator according to claim 2 or claim 3, wherein said locking device comprises two elements adapted to be placed side by side to define said seat adapted to grip said portion of the cord, said seat being threaded to cooperate with the jacket of the cord.

5. The comparator according to claim 2 or claim 3, including a flexible tube adapted to be placed over the cord in the vicinity of the locking device in order to protect the jacket of the cord, said locking device defining an element adapted to lock said flexible tube to said locking device.

6. The comparator according to claim 2 or claim 3, wherein said locking device has a side surface of a size corresponding to the transverse size of the handle.

7. The comparator according to claim 6, in which said handle has one end with a substantially cylindrical outer surface, said side surface of said locking device being coaxial with the outer surface of the end of the handle, said two surfaces having the same diameter.

8. The comparator according to claim 3, wherein said locking device comprises two elements adapted to be placed side by side to define said seat adapted to grip said portion of the cord, said seat being threaded to cooperate with the jacket of the cord, said two elements being clamped against opposite faces of the tangs.

9. The comparator according to claim 2 being composed of a plurality of assembled components, one of which constitutes the handle, another of which comprises a movable unit having said arms, said transducer means, the cord and the connector.

* * * * *